United States Patent [19]
Hashimoto

[11] Patent Number: 5,341,411
[45] Date of Patent: Aug. 23, 1994

[54] CALLER ID BLOCKING METHOD AND PROCESSING SYSTEM (BLOCK CALLER ID INFORMATION)

[75] Inventor: Kazuo Hashimoto, Tokyo, Japan

[73] Assignee: Hashimoto Corporation, Tokyo, Japan

[21] Appl. No.: 763,470

[22] Filed: Sep. 23, 1991

[30] Foreign Application Priority Data

Sep. 21, 1990 [JP] Japan .................. 2-253010

[51] Int. Cl.⁵ .................. H04M 1/64; H04M 1/66
[52] U.S. Cl. .................. 379/67; 379/82; 379/142; 379/188; 379/189
[58] Field of Search .................. 379/142, 67, 88, 82, 379/199, 189, 188

[56] References Cited

U.S. PATENT DOCUMENTS

| | | | |
|---|---|---|---|
| Re. 31,789 | 1/1985 | Hashimoto | 379/142 |
| 4,551,581 | 11/1985 | Doughty | 379/94 |
| 4,803,717 | 2/1989 | Marui | 379/67 |
| 4,817,133 | 3/1989 | Tabahashi et al. | 379/199 |
| 4,873,719 | 10/1989 | Reese | 379/215 |
| 4,942,598 | 7/1990 | Davis | 379/57 |
| 4,958,153 | 9/1990 | Murata et al. | 340/825.5 |
| 5,033,076 | 7/1991 | Jones et al. | 379/67 |
| 5,034,975 | 7/1991 | Grives | 379/67 |
| 5,067,153 | 11/1991 | Willie et al. | 380/23 |
| 5,161,181 | 11/1992 | Zwick | 379/67 |

FOREIGN PATENT DOCUMENTS

0439927A2  5/1990  European Pat. Off.
0437256A2  9/1991  European Pat. Off.

Primary Examiner—Thomas W. Brown
Attorney, Agent, or Firm—Lowe, Price, LeBlanc & Becker

[57] ABSTRACT

In caller ID telephone service system, if a calling party does not want to display his telephone number on the called party side, the calling party takes an authorized key number (hereinafter called "blocking key number") with the telephone exchange office. The key number is composed of a 3 or 4 digit numerical signal, like a push-phone tone, when the subscriber calls any subscriber (called party) telephone number in this service area. If he dials that key number first and then the conventional number, the telephone exchange office detects that key number, then blocks (stops) sending the calling party telephone number to the called party side. On the other hand, the called party side has a device with a relay which functions to take out the associated telephone set from the telephone line after one ring because the device cannot detect telephone number information between the first ring and second ring. However, the telephone ring signal still comes successively via the telephone line and can activate a Telephone Answering Device (TAD).

12 Claims, 3 Drawing Sheets

CALLER ID BLOCKING METHOD AND PROCESSING SYSTEM (BLOCK CALLER ID INFORMATION)

TECHNICAL FIELD

This invention relates to a caller ID blocking method and device in a calling party telephone number displaying system.

BACKGROUND ART

A caller ID telephone service system was developed in New Jersey, U.S.A. and was very successful. This system is fundamentally covered by U.S. Pat. No. Re. 31789 (Hashimoto Patent) and U.S. Pat. No. 4,551,581 (Doughty Patent).

But in this system, the calling party's telephone number shall be displayed in the called party side in force, even if the calling party does not want to be displayed in the called party's device. However, if an official or private searching organization wants to search a subscriber's personal matter, this system sometimes gives the subscriber a bad feeling or a rejected feeling when he looks at the calling party's telephone number. So, in some case, according to the will of the calling party, there was a strong request to the system not to display a calling party's telephone number in the caller ID service area.

DISCLOSURE OF THE INVENTION

This invention develops a new method for the caller ID system which displays the calling party's telephone number on the called party side.

Sometimes the calling party does not want to display his telephone number on the called party side. So, if he uses a specified number which was decided between the telephone exchange office and him, the calling party's telephone number does not display at the called party's side. But at that time, when the telephone exchange office calls the called party, the associated telephone set rings one time and, after one ring, the associated telephone set disengages the connection of the telephone line via a contact of a relay which stops the energizing due to the blocking of the telephone number information from the telephone exchange office.

But in this invention, if someone hears the first ring, he can operate one push button switch to bypass the relay. Thus, he or she can communicate directly with the calling party by picking up the handset of an associated telephone set. When no person is near the telephone, a telephone call signal continues to come in to the telephone line. A TAD, which is connected in parallel to the telephone line, can be activated by a preset number of telephone rings, and then engaged to communicate with the calling party even if nobody is there.

BRIEF DESCRIPTION OF DRAWINGS

FIG. 2A is a case without the blocking function, and FIG. 2B is a case with the blocking function;

DESCRIPTION OF THE PREFERRED EMBODIMENT

An embodiment of the present invention will be described in the following in connection with its structure and operations.

Figure 1:
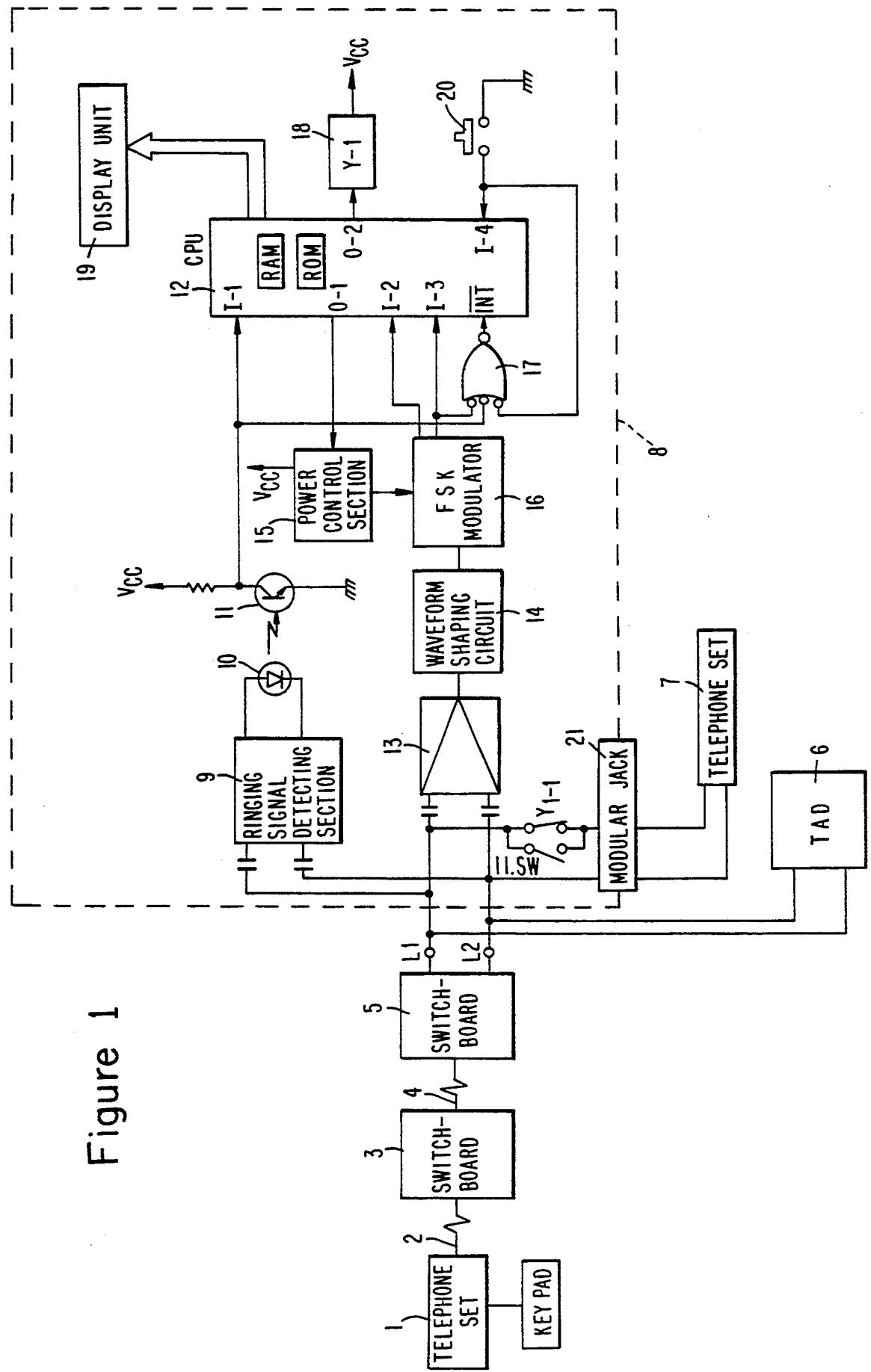
FIG. 1 is a circuit diagram of the preferred embodiment of the invention, wherein the dotted line is a receiving device.

In FIG. 1, 1 is a telephone set on the caller's side, 2 is a telephone line, 3 is a switch-board of a telephone exchange office at the caller's side, 4 is another telephone line, and 5 is a switch-board at the called party side. So, ringing signals come into a telephone set 7 at the called party side via switch-boards 3 and 5 according to the dial operation by the caller. If the aforementioned called party is registered in the switch-board 5 as a subscriber of the caller ID (Identity of Caller's telephone number) service, information of the caller's telephone number is transmitted to the receiving device 8 at the called party side via the switch-boards 3 and 5 during a silent interval between the first and second ringing signals. This exchange system has already been put in market in some areas in the U.S.A. The present invention relates to the receiving device at the called party side for such an exchange system.

Numeral 6 refers to a standard telephone answering device. This device is set to activate after three ringing signals come in; however, information of the caller's telephone number is to be transmitted during the first silent interval. Numeral 7 refers to an associated telephone set and 8 is a receiving device for receiving and displaying information of the caller's telephone components. Numeral 9 refers to a detecting section of the ringing signal. The detecting section 9 comprises a bridge diode and a capacitor (not shown), and 10 is a light emitting diode which lights while a ringing signal is applied. 11 is a photo transistor which is turned on by receiving light from the light emitting diode.

Numeral 12 refers to a one-chip microprocessor CPU, containing a RAM for memorizing information of a caller's telephone number, and a ROM in which a program is stored. INT is an interruption terminal. I-1–I-4 are input ports. O-1 and O-2 are output ports. The output of the aforementioned photo transistor is applied to the input port I-1, and the program detects whether or not a ringing signal is being applied. 13 is an amplification circuit for amplifying an FSK signal which forms information of the telephone number. The output of the amplifying circuit 13 is input to FSK demodulator 16, for instance, IC chip XR-2211, after being shaped by a waveform shaper 14. The output of the carrier signal is applied to the input port I-3 and output of data are applied to the input port I-2. At this moment, the FSK signal is usually composed of two waves, such as 1200 Hz and 2200 Hz. In the case of 1200 Hz, data becomes "1." On the other hand, in the case of 2200 Hz, data becomes "0". Therefore, when any one of 1200 Hz and 2200 Hz is applied, output of the aforementioned carrier signal is "1."

Figure 2A:
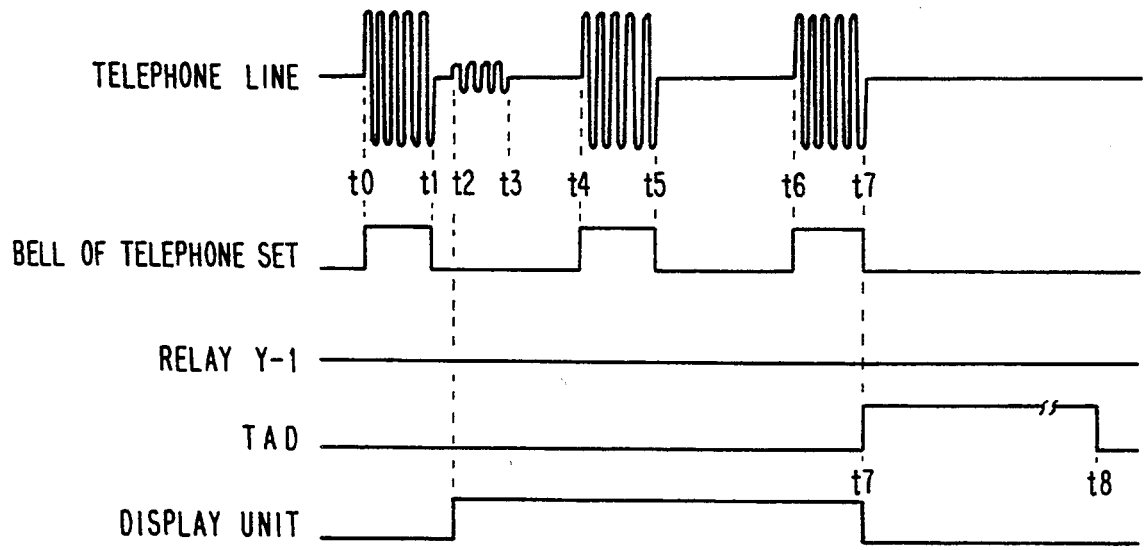
FIGS. 2(A) and 2(B) show waveforms and timing charts which indicate a relation between a ringing signal and an FSK signal including telephone number information, where
Figure 2B:
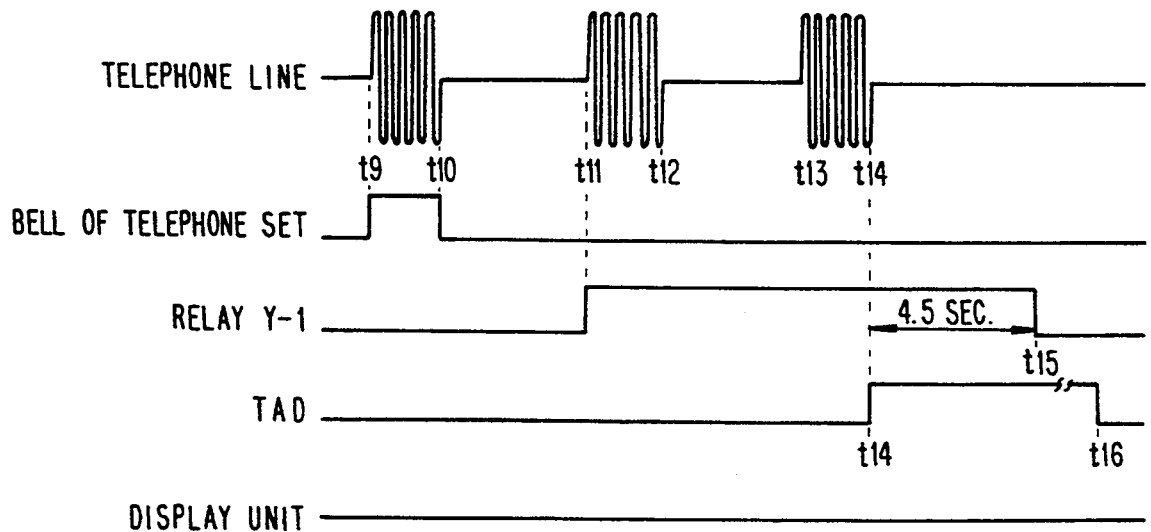

Numeral 17 refers to an OR-gate. 18 is a relay circuit with a contact yl-1 and switch H.SW which is connected in series to the telephone set 7, so as to stop the bell ringing of the telephone set 7 after a first ring unless information of caller's telephone number is transmitted (FIG. 2B). Numeral 19 refers to a display unit for displaying information of a telephone number, and 20 is a display switching button for switching the display by changing the storage region of RAM when information of a plurality of telephone numbers to be displayed is stored in the RAM.

Next, a detailed description of the present invention will be given by reference to the flowchart of FIG. 3.

Figure 3:
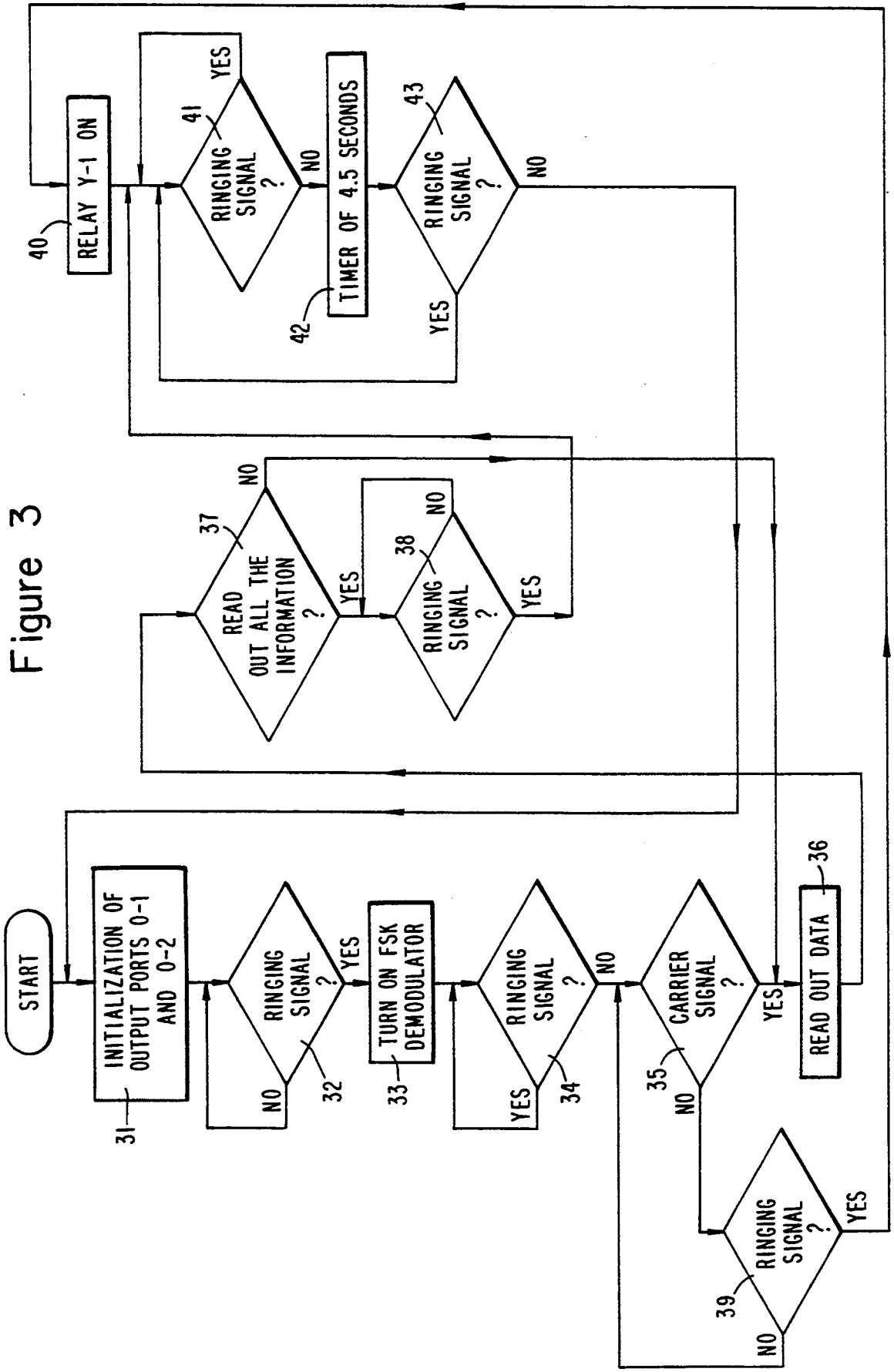
FIG. 3 is flow chart which indicates operation of this embodiment step by step.

When a receiving device is turned on (the power switch is not illustrated), in Step 31 of the flowchart shown in FIG. 3, the output ports O-1 and O-2 are initialized, and a power control section 15 is connected to output port O-1 and a relay Y-1 connected to output port O-2 become "OFF," respectively. In the next Step 32, the program awaits an incoming ring signal. When a ringing signal comes in, the ringing signal is detected by a ringing signal detecting section 9, shown in FIG. 1, and a photo transistor 11 receives a light from light emitting diode 10. Therefore, an input port I-1 of CPU 12 changes from "H" to "L." When the change from "H" to "L" is detected in Step 32, Step 32 becomes "YES."

Then, in the next Step 33, the power switch control section becomes "ON" via the output port O-1, then a power is supplied to the FSK demodulator 16, and the program awaits the FSK signal including information of the telephone number to be sent later. In the next Step 34, a silent interval (shown at t1-t4 in FIG. 2A) between the 1st ringing and 2nd ring signals is detected.

In Step 35, the carrier signal (t2-t3 in FIG. 2A) of the FSK signal is detected during the period of the silent interval. When a caller is a general subscriber without a blocking key number, the FKS signal including information of the telephone number is transmitted normally. Therefore, Step 35 becomes "YES". In Step 36, the information of the caller's telephone number is transmitted as a series signal, as in the case of well-known data transmission. Therefore, the information is read out at a predetermined timing and stored into the RAM of the CPU in a predetermined order. Simultaneously, information of the caller's telephone number can be displayed on the display unit 19. In the next Step 37, a test is performed to check whether or not all the transmitted information of the caller's telephone number has been completely read out. After reading out all the information, Step 37 becomes "YES" and then Step 38 follows.

Step 38 becomes "YES" when the next ringing signal is detected, and then the flowchart moves to Step 41. Steps 41 to 43 comprise a loop. A timer of 4.5 seconds (a silent interval between ringing signals if four seconds in USA, therefore, a longer period is set) in Step 42, which is within the aforementioned loop circuit, is used for confirming if the second ringing signal is coming successively after the first ringing signal. When the TAD starts operation after detecting three ringing signals (t7 in FIG. 2A), no more ringing signal is transmitted from the switch-board 5. Therefore, Step 43 becomes "NO" and the flowchart returns to the aforementioned Step 31.

If a caller is registered at the central office managing the switch-board 3 for receiving a service of blocking transmission of information of the caller's telephone number, the caller is given a key number, for instance "#1234," which enables him to block transmission of information of the telephone number. If the caller dials the key number prior to dialing the telephone number of a called party, the key number is recognized by the switch-board 3 and therefore information of the caller's telephone number is not transmitted to the called party (t10-t11 in FIG. 2B).

Therefore, in the case stated above, a carrier signal is not detected during the period of silent interval (t10-t11) between ringing signals. Therefore, Step 35 becomes "NO" and the flowchart moves to Step 39. When the leading edge of the second ringing signal is detected, Step 40 follows, the relay Y-1 connected to output port O-2 becomes "ON" and the contact y1-1 is broken to disconnect the telephone set 7 from the line. The bell of the telephone set 7 rings only one time and information of the caller's telephone number is not sent to the receiver. Therefore, information of the caller's telephone number is not displayed on the display unit 19.

However, as ringing signals continuously come in through the telephone line, the TAD, directly connected to the telephone line, initiates operation after the bell rings three times. The outgoing message is transmitted and the incoming message of the caller is recorded on the TAD. When the TAD operates, the telephone lines are engaged and no more ringing signal is transmitted from the central office thereafter. Thereafter, the flowchart returns to Step 31 via the aforementioned Step 41 to 43. In Step 31, the relay Y-1 stated above is disengaged. When the relay Y-1 is restored at t15 in FIG. 2B, the telephone set 7 is connected to the telephone line. Therefore, if the telephone set 7 is set off-hook, a conversation can be held with the caller.

As stated above, owing to the invention, if the blocking operation is not actuated, the telephone number of the calling party is displayed, whereas if the blocking operation is actuated, the telephone number of the calling party is not displayed. Moreover, the present invention provides means to enable to stop ringing successively after the bell of a telephone set rings once and to detect a ringing signal by a telephone answering device even though the bell of the telephone set does not ring.

Consequently, the present invention has great advantages for protecting the privacy of the calling party in Caller ID network.

I claim:

1. A method of blocking caller identification of a telephone signal to a called party in a telephone system having an exchange system between telephone devices of a calling party and the called party and the telephone device of the called party having a telephone set and a receiving device for displaying the caller identification of the calling party, said method comprising the steps of:

inputting a specified key number together with telephone number information of the called party by the calling party into his or her telephone device, connecting the telephone devices of the calling party and the called party together based on the telephone information, said exchange system blocking from the telephone signal being sent to the telephone device of the called party an FSK signal to display the caller identification when the exchange system detects the specified key number, detecting a presence or absence of an FSK signal between first bell and second bell rings of the telephone set and displaying the caller identification of the calling party to the called party only in response to the presence of said FSK signal, and energizing a relay of the receiving device to disconnect the telephone set from a telephone line in order to stop the telephone set of the called party from ringing after a predetermined number of rings.

2. A caller ID device coupled to a telephone set and an exchange system via a telephone line for processing telephone signals from the exchange system, an FSK signal used for caller identification having been blocked by the exchange system in response to a request made by a calling party when the calling party does not want to display calling party identification on a called party side, said caller ID device comprising:
    means for detecting ringing signals within the telephone signals coupled to the telephone line,
    means for receiving the FSK signal coupled to the telephone line,
    means, coupled to the ringing signals detecting means and receiving means, for detecting presence or absence of the FSK signal between first and second ringing signals,
    means for energizing a relay to disconnect the telephone set from the telephone line when the FSK signal detecting means detects the absence of the FSK signal to stop a ringer of the telephone set from ringing after a predetermined number of rings,
    means for accepting the next incoming ringing signal through the telephone line in order to enable activation of a TAD (Telephone Answering Device) after a preset number of rings, and
    means for effecting an off-hook condition on the telephone line of the exchange system to prevent the exchange system from transmitting additional ringing signals after a preset number of rings in order to allow recording of incoming messages of the calling party by a TAD (Telephone Answering Device) and thus enable communication between the calling party and an absent called party.

3. The method of claim 1 further comprising the step of disengaging the relay to reconnect the telephone set to the telephone line so that the calling party and the called party can converse with each other.

4. The method of claim 1 further comprising the step of initiating an operation of a TAD of the called party coupled to the telephone line for recording an incoming message of the calling party after the TAD detects a preset number of ringing signals within the telephone signal.

5. The caller ID device of claim 2 further comprising means for reconnecting the telephone set to the telephone line after the preset number of rings to enable communication between the calling party and the called party.

6. The called ID device of claim 2, wherein said means for receiving the FSK signal comprises:
    an amplification circuit coupled to the telephone line,
    a waveform shaping circuit coupled to said amplification circuit, and
    an FSK demodulator coupled to said waveform shaping circuit and said FSK signal detecting means.

7. The caller ID device of claim 2, wherein said ringing signals detecting means comprises:
    a diode,
    a ringing signal detection section coupled to said diode and the telephone line, said ringing signal detection of section causing said diode to emit light in response to a detection of said ringing signals, and
    a transistor coupled to said FSK signal detecting means and responsive to said light emitted by said diode to indicate to said FSK signal detecting means a direction of said first and second ringing signals.

8. A method for processing caller ID-blocked telephone calls in a telephone system, the telephone system including telephone sets of a calling party and a caller party coupled through an exchange via a telephone line for processing telephone signals, and the exchange system blocking an FSK signal used for caller identification in response to a request made by a calling party when the calling party does not want to display the caller identification on the called party side, said method comprising the steps of:
    detecting ringing signals within the telephone signals,
    detecting presence or absence of the FSK signal between first and second ringing signals,
    disconnecting the telephone set of the called party from the telephone line when the step of detecting the presence or absence of the FSK signal indicates the absence of the FSK signal to stop a ringer of the telephone set of the called party from ringing after a predetermined number of rings,
    accepting the next incoming ringing signals received over the telephone line in order to enable activation of a TAD (Telephone Answering Device) after a preset number of ringing signals, and
    effecting an off-hook condition on the telephone line to prevent the exchange system from transmitting additional ringing signals after a preset number of ringing signals in order to allow a recording of incoming messages of the calling party to be made by a TAD (Telephone Answering Device) so to enable communication between the calling party and a absent called party.

9. The method of claim 8 further comprising the step of:
    reconnecting the telephone set to the telephone line after the present number of rings, to enable communication between the calling party and called party.

10. A system for blocking caller identification of a calling party to a called party comprising:
    a first telephone device for use by the calling party and having means for inputting a specified key number together with telephone number information of the called party,
    an exchange system coupled to said first telephone device via a telephone line, said exchange system blocking from telephone signals being sent to the called party an FSK signal when the exchange system detects the specified number, and
    second telephone device for use by the called party coupled to the exchange system via a telephone line and having a telephone set and a receiving device for displaying the caller identification of the calling party, said receiving device comprising:
    a display device for outputting the caller identification, means for detecting a presence or absence of said FSK signal between first and second bell rings of the telephone set and displaying on the display device the caller identification only in response to the presence of said FSK signal,
    a relay coupled between the telephone set and the telephone line, and
    means for energizing the relay to disconnect the telephone set from the telephone line by energizing of the relay in order to stop the telephone set of the called party from ringing after a predetermined number of rings.

11. The system of claim 10, wherein said receiving device further comprises means for disengaging the relay to reconnect the telephone set to the telephone line so that the calling party and the called party can communicate with each other.

12. The system of claim 10, wherein said second telephone device includes a telephone answering device for recording an incoming message after the telephone answering device detects a preset number of ringing signals.

* * * * *